Jan. 15, 1957  T. F. FLAVIN  2,777,552
CONTROLLED ACCELERATION CLUTCH MECHANISM
Filed Dec. 31, 1954  2 Sheets-Sheet 1

INVENTOR.
THEODORE F. FLAVIN

Jan. 15, 1957 T. F. FLAVIN 2,777,552
CONTROLLED ACCELERATION CLUTCH MECHANISM
Filed Dec. 31, 1954 2 Sheets-Sheet 2

INVENTOR.
THEODORE F. FLAVIN
BY
ATTORNEY

United States Patent Office 2,777,552
Patented Jan. 15, 1957

2,777,552

CONTROLLED ACCELERATION CLUTCH MECHANISM

Theodore F. Flavin, Vestal, N. Y., assignor to International Business Machines Corporation, New York, N. Y., a corporation of New York Application December 31, 1954, Serial No. 479,114

12 Claims. (Cl. 192—52)

The present invention relates to selective controlled-acceleration clutch mechanisms for starting and stopping a load in a controlled-acceleration manner by which to provide shock-free clutch operation.

It is frequently desirable selectably to complete and to interrupt a mechanical drive connection between a continuously rotating drive member and a rotatable driven member. Such is usually accomplished by a clutch mechanism, and in certain applications it is desirable upon clutch engagement to provide controlled acceleration of the driven member from rest up to the angular velocity of the driving member with controlled deceleration upon clutch disengagement. An arrangement of this type is disclosed in the Gardinor et al. Patent No. 2,633,957, granted April 7, 1953, entitled Clutch, which employs a form of Geneva gear to provide the desired deceleration and deceleration of the driven member. While this form of clutch structure is satisfactory for many applications, it would be desirable to provide a more simple and compact construction using fewer mechanical components.

It is an object of the present invention to provide a new and improved selective controlled-acceleration clutch mechanism which possesses the desirable features last enumerated.

It is a further object of the invention to provide a novel clutch mechanism of the type described which upon clutch actuation is capable of starting a load device smoothly from rest to its running condition, and upon declutching to decelerate the load device smoothly to a predetermined position at rest.

It is a further object of the invention to provide an improved selective controlled-acceleration clutch mechanism which consistently insures upon clutch engagement the establishment of pre-selected angular relationships between the drive source and the driven load device in their full speed driving relationship as well as pre-determined stop positions of the load device following declutching of the latter from the drive source.

A selective controlled-acceleration clutch mechanism embodying the invention includes rotary drive and driven elements, rotary coupling means having axial displacement for selectively completing and interrupting a variable-ratio mechanical driving connection between these elements, and means for selectively controlling the coupling means selectably to actuate the driving connection while at the same time controlling the axial displacement of the coupling means to provide controlled differential drive between the drive and driven elements.

Other objects and advantages of the invention will appear as the detailed description thereof proceeds in the light of the drawings forming a part of this application, in which:

Fig. 3 is an end elevational view along a plane 3—3 of Fig. 1;

Figure 1:
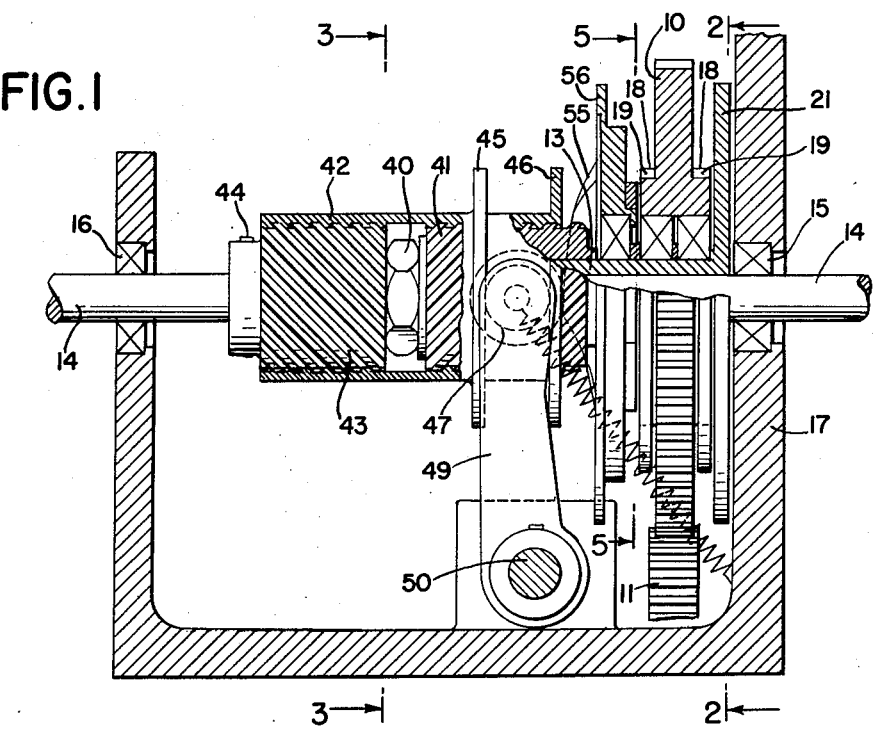
Fig. 1 illustrates, partly in cross-section, a clutch mechanism embodying the present invention in a particular form.

Referring now more particularly to Fig. 1, the clutch includes a drive element comprising a gear 10 which is driven through a gear 11 from a drive source, not shown. The gear 10 is journaled to rotate freely on a sleeve 13 which likewise freely rotates upon a driven element comprised by a shaft 14 journaled in bearings 15 and 16 provided in a frame 17. The gear 10 has concentric shoulders 18 in which are provided, equally spaced around the shoulder periphery, a plurality of latch engageable notches 19 shown more clearly in Fig. 2. A drive latch plate 21 is provided on one end of the sleeve 13 and supports a latch 22 pivoted at 23 to the plate 21 and having a projection 24 adapted to engage the notches 19 of the gear 10. The latch 22 is biased by a spring 25 toward engaging position with the notches 19, but is restrained in disengaged position by engagement of a latch end portion 26 with a notch 27 provided in a latch arm 28 actuated by an electromagnet 29.

The latch arm 28 is pivoted on a shaft 30, and has affixed thereto a gear sector 31 which meshes with a gear 32 pivoted on a shaft 33. Affixed to the gear 32 is a latch arm 34 having a notch 35 adapted to move into engaging relation with the end of a cam-plate latch presently to be described. The latch arm 28 is biased toward latching engagement by means of a compression spring 37 acting on the latch arm 34, which applies a counterclockwise moment through the meshing sector gears 31 and 32. Under these conditions the arm 34 is urged out of engagement with the above-mentioned cam-plate latch.

Figure 4:
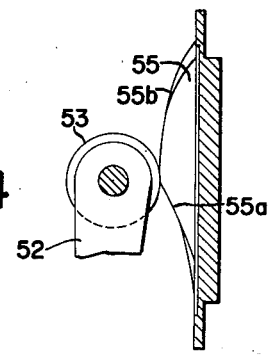
Fig. 4 is a fragmentary view along a plane 4—4 of Fig. 3 and is used to illustrate more clearly a cam surface configuration employed in the clutch construction.

The end of the sleeve 13 opposite the drive plate 21 is threaded and has secured upon its end by a nut 40 a left-hand threaded screw or spline 41. Threaded upon the spline 41 is a rotary coupling means comprised by sleeve 42 which also threadingly engages a right-hand threaded screw or spline 43 secured by a pin 44 to the driven shaft 14. The sleeve 42 has spaced radial flanges 45 and 46 so that it may rotate freely about its axis, and it may also move axially on the splines 41 and 43 but only under control of a selectable control means which controls the axial displacement of the element 42 to provide differential drive ratios between the drive element 10 and driven element 14. This control means includes cam rollers 47 and 48 (Fig. 3) which are positioned between the flanges 45 and 46 and are carried by individual ones of the arms 49, 49 of a cam-follower assembly. The latter is journaled upon a shaft 50 retained in the frame 17 by a set screw 51. The cam-follower assembly includes an arm 52 carrying at its upper end a cam-follower roller 53, and is biased by a spring 54 into engagement with a cam acceleration-control surface 55 provided on a peripheral edge portion of a cam plate 56 journalled to rotate freely on the sleeve 13. The configuration of the cam surface 55 is shown more clearly in Fig. 4 and includes an acceleration portion 55a and a deceleration portion 55b.

Figure 5:
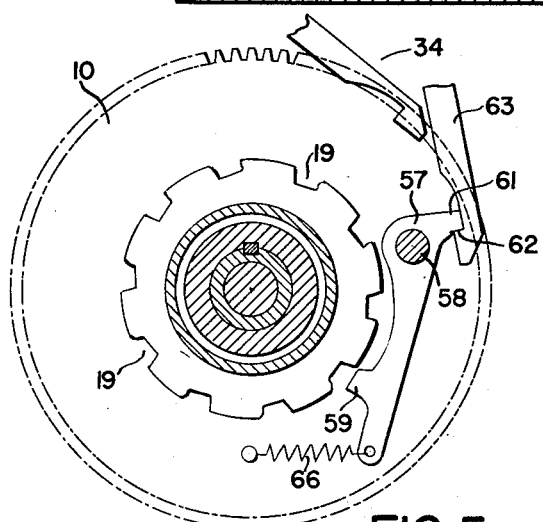
Fig. 5 is a view along the plane 5—5 of Fig. 1 to show the details of a cam-plate latch structure employed in the clutch structure.

The cam plate 56 carries a latch 57, Fig. 5, which is pivoted at 58 to the cam plate and includes a projection 59 for engaging the latch notches 19 of the drive gear 10. The latch 57 is biased by a spring 66 toward latch engagement, but is restrained from such engagement by a latch projection 61 which engages a notch 62 provided in a latch arm 63 moving under control of the electromagnet 29. Actually, the latch arm 28 (Fig. 2) and the latch arm 63 last mentioned are supported in parallel relation on the shaft 30 for movement in unison, the arms being spaced to straddle the drive gear 10 so that the arm 28 engages the latch 22 as explained above and as shown in Fig. 2 while the other arm 63 engages the latch 57 as last explained. The latch arm 34 also engages the latch 57 of the cam plate for a purpose which will become apparent during the following description of the clutch operation.

Consider now the operation of the clutch mechanism thus far described, and assume initially that the clutch is in disengaged position with the electromagnet 29 de-energized and the latch 22 engaged by the latch arm 28 and the latch 57 engaged by the latch arm 63. The drive gear 10 is driven through gear 11 from the drive source, not shown, to rotate at constant angular velocity on the sleeve 13 and the drive plate 21 and cam plate 56 are at rest under the conditions assumed. If current is now supplied to the electromagnet 29, the latch arms 28 and 63 are withdrawn from engagement with their respective latches 22 and 57. The latter thereupon are moved by their respective springs 25 and 60 to engage a corresponding one of the notches 19 of the drive gear 10. This immediately establishes a driving connection between the drive gear 10 and both the drive plate 21 and cam plate 56 in which are accordingly set in motion at the same angular velocity as the drive gear 10.

The drive plate 21, through its sleeve 13, drives the spline 41 at full velocity. The cam plate 56 upon being set in motion permits the cam roller 53 to ride down the sloping portion 55a (Fig. 4) of the cam surface 55, and this in turn permits the arms 49 of the cam-follower assembly to move clockwise in the view shown in Fig. 1. This clockwise motion when imparted through rollers 47, 48 to the sleeve 42 permits the latter to move axially to the right. The pitch of the reverse threads on the splines 41 and 43 and the shape of the cam slope 55a are so selected that the sleeve 42 initiates rotation about its axis at half the angular velocity of the drive gear 10, and in doing so is permitted to move at such axial velocity as effectively to thread itself off of the spline 43 and onto the spline 41 without imparting any drive force to the spline 43 so that the driven shaft 14 initially remains stationary. However, as the cam roller 53 moves down the cam slope 55a toward the region of dwell on the cam plate 56, the cam slope is so changed that the rate of axial displacement of the sleeve 42 is reduced and its angular velocity correspondingly increases since it no longer is able freely to thread itself onto the spline 41. This increased angular velocity and reduced rate of axial displacement of the sleeve is imparted as a driving force to the spline 43 and the driven shaft 14 thereupon is accelerated and begins to rotate. The overall cam surface 55a has a configuration so selected that the sleeve 42 has zero rate of axial displacement, and accordingly is accelerated to full angular velocity, just as the cam roller 53 reaches the dwell portion of the cam plate 56. At this time drive plate 21 is directly mechanically connected through its sleeve 13, the splines 41 and 43 and the sleeve 42 to the driven shaft 14 which thereafter is driven at the same angular velocity as the drive gear 10.

As the electromagnet 29 moved the latch arms 28 and 63 out of engagement with the respective latches 22 and 57, the latch arm 34 was moved by the gears 31 and 32 into engageable position with the latch 57 which at this time is moving with the cam plate 56. After the drive gear 10 rotates approximately 324° following latch engagement, the portion 61 of the latch 57 engages the notch 35 of the arm 34 and interrupts drive of the cam plate 56 from the drive gear 10. At this time, the cam surface 55b is just ready to engage the cam roller 53 at the moment of subsequent clutch disengagement.

Upon de-energization of the electromagnet 29, the latch arms 28 and 63 move toward engageable position with the respective latches 22 and 57. The arms may be prevented from moving to full engaging position, however, by the fact that the latch arm 28 is made sufficiently wide that it rides upon the outer periphery of the drive plate 21 until it reaches a notch, the position of which is indicated by the broken line 66 in Fig. 2, cut into the periphery of the drive plate. Upon reaching this notch, the arms 28 and 63 are permitted to drop fully into engageable position with respective latches 22 and 57. Engagement of the latch arm 28 with the latch 22 interrupts drive of the drive plate 21, and it will be apparent that this interruption always occurs at a predetermined angular position of the drive plate. Upon engagement of the latch arm 28 and latch 22, the notch 27 of the latch arm also engages the radial edge of the notch 66 cut in the periphery of the drive plate 21 and brings the latter to a positive stop at a preselected "home" position. At the same time, a keeper bar 67 provided on the latch arm 28 and biased by a relatively light spring 68 to latching position engages a notch (positioned as indicated by broken line 69 in Fig. 2) milled into the face of the drive plate 21 and locks the drive plate against reverse rotation as would tend to occur during deceleration of the output shaft 14 in a manner presently to be described. The latch arm 63 does not engage the latch 57 until a short interval later since the latter has been retained by the latch arm 34.

As the latch arms 28 and 63 move into full engageable position with the latches 22 and 57, the latch arm 34 disengages the latch 57 by motion imparted through gears 31 and 32. The latch 57 thereupon again latches the cam plate 56 to the drive gear 10 which, as has just been pointed out, is disengaged at this time from the drive plate 21 by engagement of the latch 22 with the latch arm 28. The cam plate 56 accordingly moves the cam roller 53 up the cam slope 55b, and the cam-follower assembly correspondingly moves the sleeve 42 axially to the left. Since the drive plate 21 is restrained by the keeper 67 from rotating in reverse direction as mentioned above, cam-actuated movement of the sleeve 42 axially to the left forces it to thread off of the stationary spline 41 and onto the driven spline 43. This action decelerates the driven shaft 14, the deceleration continuing until the cam roller 53 is on the top-most portion of dwell of the cam surface 55b at which time the driven shaft 14 has been decelerated to rest. At this moment the latch 57 comes into engagement with the notch 62 of the latch arm 63, thereby to disengage the cam plate 56 from the drive gear 10 to complete the clutch deactuation. The latch arm 63 may if desired be provided with a keeper, similar to that of the latch-arm keeper 67, which may cooperate with a tongue 70 (Fig. 3) provided on a plate secured to the cam plate 56 by which to latch the latter against reverse rotation from its "home" position last mentioned. Further, and while not shown in the drawings, a keeper may similarly be provided on the latch arm 34 to maintain latched engagement of this arm with the latch 57 during intervals of clutch direct drive.

Figure 2:
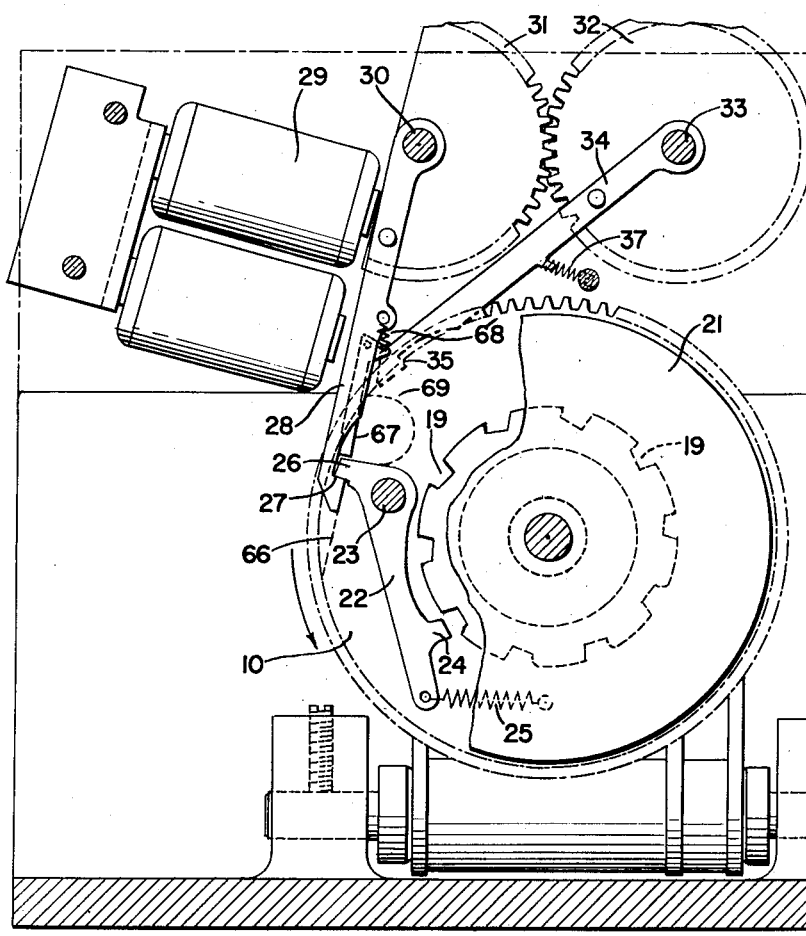
Fig. 2 is an end elevational view, partially broken away, along a plane 2—2 of the Fig. 1 construction.

For ten latch engageable notches 19 in the drive gear 10, as illustrated in Fig. 2, the overall length of the cam surfaces 55a and 55b is 36° of the cam plate 56. It will be appreciated that the length of such cam surfaces may vary, thus enabling longer or shorter periods of load acceleration and deceleration.

It will be apparent from the foregoing description of the invention that a selective controlled-acceleration clutch embodying the invention enables starting of a driven load smoothly from rest to running condition and deceleration smoothly from running condition back to a condition of rest. The clutch also provides direct drive for accelerated load devices, and permits pre-selected angular relationships to exist between the drive and driven members during direct drive while permitting the driven member to stop at a pre-determined angular position at the completion of the declutching operation. A clutch mechanism embodying the invention has the additional advantage that the acceleration and deceleration of the load device is accomplished without appreciable shock, and the clutch operation is conveniently controlled by selective actuation of a single electromagnet.

What is claimed is:

1. A selective controlled-acceleration clutch mechanism comprising, rotary drive and driven elements, rotary coupling means having axial displacement for selectively completing and interrupting a variable-ratio mechanical driving connection between said elements, and means for selectably controlling said coupling means selectably to actuate said driving connection and for controlling said axial displacement thereof to provide controlled differential drive ratios between said elements.

2. A selective controlled-acceleration clutch mechanism comprising, rotary drive and driven elements, rotary coupling means having axial displacement for selectively completing and interrupting a variable-ratio mechanical driving connection between said elements, and means for selectably actuating said coupling means selectably to complete said driving connection and for controlling said axial displacement thereof to provide controlled acceleration of said driven element.

3. A selective controlled-acceleration clutch mechanism comprising, rotary drive and driven elements, rotary coupling means having axial displacement for selectively completing and interrupting a variable-ratio mechanical driving connection between said elements, means for selectably controlling said coupling means selectably to actuate said driving connection, and means responsive to each completion and interruption of a driving connection by said coupling means for controlling in opposite senses said axial displacement to provide successive acceleration and deceleration of said driven element.

4. A selective controlled-acceleration clutch mechanism comprising, coaxially supported drive and driven elements, rotary coupling means coaxially interposed between said elements and having axial displacement for selectably completing and interrupting a variable-ratio mechanical driving connection therebetween, and means for selectably controlling said coupling means selectably to actuate said driving connection and for controlling said axial displacement thereof to provide controlled differential drive ratios between said elements.

5. A selective controlled-acceleration clutch mechanism comprising, rotary drive and driven elements, rotary coupling means having axial displacement for selectively completing and interrupting a variable-ratio mechanical driving connection between said elements, and means for selectably actuating said coupling means selectably to complete said driving connection and for concurrently actuating a camming mechanism having control over said axial displacement thereof to provide preselected control of the rate of acceleration of said driven element.

6. A selective controlled-acceleration clutch mechanism comprising, rotary drive and driven elements, rotary coupling means having longitudinal displacement along its axis for selectively completing and interrupting a continuously-variable-ratio mechanical driving connection between said elements, and means for selectably controlling said coupling means selectably to actuate said driving connection and for controlling said axial displacement thereof to provide controlled differential drive ratios between said elements.

7. A selective controlled-acceleration clutch mechanism comprising, rotary drive and driven elements, rotatable first and second clutch members mechanically interconnected by threaded engagement with a third clutch member having axial displacement, one of said first and second clutch members being connected to said driven member, means for selectably connecting the other of said first and second clutch members to said drive member to complete and interrupt a driving connection between said drive and driven members, and means for controlling the axial displacement of said third clutch member to control the drive ratio between said drive and driven members.

8. A selective controlled-acceleration clutch mechanism comprising, rotary drive and driven elements, screw and nut speed-differential members providing variable speed drive by controlled relative axial displacement thereof, means including said members for selectably completing and interrupting a mechanical driving connection between said elements, and means for selectably controlling said members to actuate said driving connection and for controlling said relative axial displacement of said members to provide controlled differential drive ratios between said elements.

9. A selective controlled-acceleration clutch mechanism comprising, rotary drive and driven elements, rotary clutch members having screw-threaded engagement and one having axial displacement, means including said clutch members for selectably completing and interrupting a mechanical driving connection between said elements, and means for selectably controlling said coupling means selectably to actuate said driving connection and for controlling the axial displacement of said one clutch member to provide controlled differential drive ratios between said elements.

10. A selective controlled-acceleration clutch mechanism comprising, rotary drive and driven elements, a left-hand threaded clutch member and a right-hand threaded clutch member supported for coaxial rotation and mechanically interconnected by threaded engagement with a floating sleeve clutch member having freedom of rotational and axial displacements, one of said clutch members being connected to said driven element, means for selectably connecting the other of said clutch members to said drive element to complete and interrupt a driving connection between said drive and driven elements, and cam means selectably actuated from said drive element to control the axial displacement of said sleeve while permitting rotational displacement thereof to control the drive ratio between said drive and driven elements.

11. A selective controlled-acceleration clutch mechanism comprising, rotary drive and driven elements, a differential-speed drive mechanism having an output connected to drive said driven element and having a controlled differential speed varying with the rate of movement of a control member thereof, cam means for controlling during an acceleration interval the movement of said differential control member, and means for selectably completing a drive connection of said cam means and the input of said differential to said drive element and for automatically interrupting the drive connection of said cam means at the end of said acceleration interval.

12. A selective controlled acceleration clutch mechanism comprising, rotary drive and driven elements, a differential-speed drive mechanism having an output connected to drive said driven element and having a controlled differential speed varying with the rate of movement of a control member thereof, cam means for controlling in opposite senses during successive preselected intervals the movement of said differential control member, means for selectably controlling and interrupting a mechanical driving connection between the input of said differential and said drive element, and means responsive to each completion and interruption of driving connection by said last-named means for completing a driving connection between said cam means and said drive element during each said interval.

References Cited in the file of this patent
UNITED STATES PATENTS

| | | |
|---|---|---|
| 2,633,957 | Gardinor et al. | Apr. 7, 1953 |
| 2,699,072 | Wrinkle | Jan. 11, 1955 |